United States Patent [19]

Wristers et al.

[11] 4,220,555

[45] Sep. 2, 1980

[54] PREPARING POLYOLEFINS WITH A NARROW PARTICLE SIZE DISTRIBUTION AND CATALYST THEREFOR

[75] Inventors: Harry J. Wristers; Eugene E. Poirot; Terrence Huff, all of Baytown, Tex.

[73] Assignee: Exxon Research & Engineering Co., Florham Park, N.J.

[21] Appl. No.: 938,661

[22] Filed: Sep. 7, 1978

Related U.S. Application Data

[63] Continuation-in-part of Ser. No. 837,431, Sep. 28, 1977, abandoned.

[51] Int. Cl.$^2$ .............................................. C08F 4/64
[52] U.S. Cl. ............................ 252/429 B; 526/144; 526/159
[58] Field of Search ................................... 252/429 B

[56] References Cited

U.S. PATENT DOCUMENTS

| 3,094,568 | 6/1963 | Hay et al. | 252/429 B X |
| 3,990,993 | 11/1976 | Wristers | 252/429 B |

FOREIGN PATENT DOCUMENTS 2342200  3/1974  Fed. Rep. of Germany .

OTHER PUBLICATIONS

Hackh's Chemical Dictionary, Fourth Edition, (1969), p. 472, McGraw-Hill Book Co., N.Y., N.Y.

*Primary Examiner*—Patrick Garvin
*Attorney, Agent, or Firm*—Ben C. Cadenhead

[57] ABSTRACT

Polyolefins are prepared wherein at least about ninety-five percent of the product is retained on a 100 mesh screen. The polymerization process involves contacting the alpha-olefin with a Ziegler catalyst system wherein the catalyst has been prepared by mixing the active catalytic particles with a fibrillatable polyolefin and a non-fibrillatable polyolefin followed by ballmilling the mixture for a period of time sufficient to cause a fibrous mat to form, entrapping the catalyst particles in the mat which is, in turn, carried by the non-fibrillatable polyolefin.

10 Claims, No Drawings

PREPARING POLYOLEFINS WITH A NARROW PARTICLE SIZE DISTRIBUTION AND CATALYST THEREFOR

CROSS-REFERENCE TO RELATED APPLICATION

This application is a continuation-in-part of U.S. Application Ser. No. 837,431, filed Sept. 28, 1977, and now abandoned.

BACKGROUND OF THE INVENTION

This invention relates to the polymerization of olefins using a Ziegler catalyst system to produce large particles of product having a narrow particle size distribution and only very small amounts of fines.

The polymerization of olefins in the presence of Ziegler polymerization catalyst systems is well known and it is further known that the use of such catalyst particles provide "templates" for the formation of the polymer particles, the size and size distribution of such polymer particles being largely dependent upon the size and particle size distribution (PSD) of the catalyst being used.

Catalysts of this type are difficult to handle and techniques to modify them are limited. Agglomeration with "binders" is unsuitable since "binders" normally poison the catalyst sites and sieving the catalyst particles to remove catalyst "fines" is wasteful since large quantities of useless fines are accumulated.

With certain olefin polymerization catalysts, the growth of the catalyst itself from the original catalyst seeds can be controlled to yield products having a coarse structure (20 microns or larger ) which makes these catalysts more easily handled. Thus, A. P. Haag and M. Weiner (U.S. Pat. No. 3,623,846, issued Nov. 30, 1971, assigned to Dart Industries, Inc.) described a process for controlling particle size during condensation and/or desublimation of a material such as titanium trichloride which may be used in the polymerization of alpha-olefins.

In another example as described in British Pat. No. 1,139,450, assigned to Shell Internationale Research Maatschappij, TiCl$_3$ catalysts are formed by controlled reduction of titanium tetrachloride with aluminum alkyls. These materials have a narrow PSD, and have an average diameter greater than 15 microns, and therefore are relatively easy to handle.

However, the latter two examples illustrating two techniques for improving the particle size of catalysts, specifically titanium trichloride olefin polymerization catalysts, have certain limitations. Thus, although the catalyst particle size is greater than the 1 micron dimension which is normally available, the 20 micron size still limits the usability of these catalysts. Increase in catalyst growth to yield particles 100 microns or larger is more difficult. Furthermore, control of particle size during catalyst synthesis is a problem common to every type of catalyst that might be employed. What is needed, therefore, is a technique that is applicable to Ziegler-type catalysts in general, a procedure that is easy to employ, and one that can yield catalysts with a narrow PSD and large particle size; i.e., most of the particles having a diameter of about 150 microns or greater.

In U.S. Pat. No. 3,990,993 (assigned to Exxon Research and Engineering Company), a procedure is described whereby olefin polymerization catalysts, i.e., Ziegler TiCl$_3$-nAlCl$_3$, can be mechanically treated with a fibrillatable polytetrafluoroethylene (PTFE) in order to trap the catalyst "fines" in a web of PTFE microscopic fibers, thus producing a catalyst of larger particle size having a more narrow particle-size distribution. Nevertheless, the catalyst is still limited in size obtainable and in particle size distribution by the randomizing technique of fracturing the catalyst-PTFE mixture using shearing forces such as ballmilling.

While it is pointed out that the patentee is concerned with the particle size range of various catalytic materials and the desirability to form these materials into large, uniform, easily handled shapes, U.S. Pat. No. 3,990,993 clearly expresses concern for fines resulting from ballmilling of polyolefin catalysts. Excessive ballmilling caused the PSD to be widened since fines were again produced, even in the presence of the fibrous web. Such concern is unnecessary in the practice of this invention.

Further, as an expression of the prior art, U.S. Pat. No. 3,051,662 (assigned to Phillips Petroleum Company) describes the use of polyolefins as binders and lubricants for shaping solid materials. The disclosure teaches the formation of simple mixtures which are extruded through a die. In some instances where metal oxide catalysts are involved, the lubricant-binder of the invention is removed, usually by incineration or vaporization. This would destroy the activity of many catalysts. PTFE is only casually mentioned, and the disclosure fails completely to recognize the importance of the invention as disclosed and claimed herein.

Further, U.S. Pat. Nos. 3,838,062, 3,838,092, and 3,993,584 disclose the use of a fibrillatable PTFE to create a weak agglomerate of dusts, particularly toxic dusts.

Surprisingly it has now been discovered that the PSD can be held within a narrow range producing large catalyst particles by using one aspect of this invention. Once such particles are produced a polymerization process can be conducted which results in the production of polyolefins, particularly polyethylene and polypropylene which have large particles and a narrow PSD.

SUMMARY OF THE INVENTION

In its broadest aspect this invention is an improvement in the process for polymerizing or copolymerizing olefins, particularly ethylene or propylene, wherein the olefin is contacted with the Ziegler catalyst system of a titanium halide component and an organic aluminum cocatalyst component under polymerization conditions. The improvement involves using, as the Ziegler catalyst system, catalyst particles which have been mixed with both a fibrillatable polyolefin, such as polytetrafluoroethylene (PTFE) or a fibrillatable ethylene/propylene copolymer, and a non-fibrillatable polyolefin such as polyethylene, polypropylene, ethylene/propylene copolymers or polyvinylchloride. The mixture is then subjected to shearing forces such that the fibrillatable polyolefin forms a fibrous web which traps the catalyst particles and further which fibrous web becomes attached to particles of the non-fibrillatable polyolefin such that further degradation of particle size is prohibited if milling is continued.

The polyolefin particles, particularly polypropylene or polyethylene, resulting from a polymerization process using the foregoing catalyst results in large particle size with a narrow particle size distribution, such that about ninety-five percent of the particles resulting from the polymerization process will fail to pass a 100 mesh screen which is equivalent to saying that about 95% or more have a particle diameter of about 150 microns or greater.

DETAILED DESCRIPTION OF THE INVENTION

The polyolefin product resulting from this process will be largely particles which will fail to pass a 100 mesh screen. At least about ninety-five percent of the polyolefin produced will be retained thereon. Stated differently at least about ninety-five percent of the polymer particles will be about 150 microns in diameter or larger.

Polymerization according to this invention and recovery of polymer are suitably carried out according to methods and conditions known to be suitable for low-pressure olefin polymerization processes of the prior art. This includes batch, semibatch or continuous operations under conditions that exclude air and other atmospheric impurities, particularly moisture.

The reaction is typically conducted at temperatures between 0° and 150° F. with temperatures between 40° and 70° generally preferred. The reaction pressure is not critical. It is usually only sufficiently high to maintain liquid phase reaction conditions. It may be autogenous pressure, which will vary depending upon the components of the reaction mixture and the temperature, or it may be higher, e.g., up to 1000 psi. High pressures are suitably obtained by pressuring with monomer gas or with an inert gas.

In batch operations the polymerization time can be varied as desired; it may vary, for example, from a few minutes to several hours. Polymerization in batch processes may be terminated when monomer is no longer absorbed, or earlier, if desired, e.g., if the reaction mixture becomes too viscous. In continuous operations the polymerization mixture passes through a reactor of any suitable design well known to those skilled in the art. The polymerization reactions in such cases are suitably adjusted varying the residence time. Residence times vary with the type of reactor system and range, for example, from 10 to 15 minutes to two hours or more.

In a suitable continuous operation, fresh feed, diluent and the Ziegler catalyst system are continuously introduced into an agitated reaction zone and reaction mixture is withdrawn from the zone for removal and polymer recovery. Heat of reaction may be withdrawn by indirect heat exchange or by evaporation of diluent and/or monomer in the reaction zone.

After the polymerization is complete, polymer is recovered from a slurry or solution of the polymer in reaction diluent. A simple filtration may be adequate to separate polymer from diluent but other means for separating polymer from diluent may be satisfactorily employed. The polymer may be treated, separately or while slurried in the reaction mixture, in order to separate catalyst residues. Such treatment may be with alcohols, such as methanol, ethanol, or isopropanol; with acidified alcohols; or with other similar polar liquids. In many cases the polymers are obtained in hydrocarbon solutions and the polymer can be recovered by coagulation with acidified alcohol, e.g., rapidly stirred methanol or isopropanol containing 2 wt.% hydrochloric acid. Following this initial coagulation the polymers are preferably washed several more times in methanol.

The concentration of monomer in the reaction mixture may vary upward from 5 percent by weight of the reaction mixture, depending on the conditions employed; the range from 20 to 80 percent by weight is preferred.

It is preferred to carry out the reactions according to this invention in a suitable diluent which is liquid under the conditions of reaction and inert under these conditions. The diluent may have the same number of carbon atoms per molecule as the olefin reactant or it may be in a different boiling range. Preferred diluents are alkane and cycloalkane hydrocarbons. Suitable diluents are, for example, propene, propane, butane, isobutane, n-heptane, cyclohexane, methylcyclohexane, Tetralin, Decalin, or saturated hydrocarbon mixtures in the gasoline boiling range or diesel oil boiling range. Aromatic hydrocarbons such as benzene, toluene, isopropylbenzene, xylene, or the like, or halogenated aromatic compounds such as chlorobenzene, or ortho-dichlorobenzene and the like may also be employed, if desired.

The Ziegler catalyst systems employed are suitably used in a concentration ranging from about 0.1 to about 2% by weight of catalytically active material based on weight of the reaction mixture.

Preferred catalytically active materials for use in this invention are Ziegler-type titanium halide catalyst systems, e.g., catalysts obtained by reduction of the tetrahalide of titanium to a titanium compound with a lower oxidation state, such as $TiCl_3 \cdot xAlCl_3$ where x is between 0.01 to 1.5; $TiCl_m \cdot AlR_nCl_{3-n}$, where x is between 0.0 to 1.5, m is between 2 to 3.5, n is between 0.01 to 3, and R is an organic radical such as an organic hydrocarbon radical, preferably alkyl radicals having from one to about five carbon atoms such as $CH_3$, $C_2H_5$, etc., or other organic radical that normally is known as described by Mole and Jeffrey, "Organoaluminum Compounds", Elsevier, (1972); $MX'_m \cdot xM'R_nX_{3-n}$ where metals, M and M' are selected from groups IIIB, IVB and VB of the periodic table, X and X' are elements of groups VIA and VIIA of the periodic table, and m, x and n vary as described above. It is well known that the compounds induced are mixtures and that the ranges of values of m, x and n herein are average values.

In preparing the catalyst of this invention used in the practice of the polymerization reaction of this invention the non-fibrillatable polyolefin is an inert maleable material which does not fracture on impact. Such non-fibrillatable polyolefins include non-fibrillatable unsubstituted and halogen-substituted polyolefins, preferably selected from polyethylene, polypropylene, ethylene/propylene copolymers and polyvinylchloride (PVC) and the like. In the overall mixture the non-fibrillatable polyolefin is from about 20 to about 70 wt.% of the catalyst with the amounts being preferably from about 40 to about 60 wt.%. It would be selected from material which, itself, has a narrow particle size distribution and be substantially free of particles having a diameter of less than about 20 microns.

In the practice of this invention, a mixture of the solid catalyst particles, the non-fibrillatable polyolefin, and the fibrillatable polyolefin is made such that the fibrillatable polyolefin is present in an amount from about 1 wt.% to about 5 wt.% of the mix and, preferably, from about 1.5 wt.% to 2.5 wt.%. Even though greater amounts than 5 wt.% can be used, little advantage, if any, is obtained. It is best to use the minimum amount necessary to entrap the active catalyst particles, which, under the practice of the present invention, even in the case of the Ziegler-type catalyst is being used, remain remarkably active even though the non-fibrillatable polyolefin is present with the active catalyst.

A fibrillatable polyolefin is an unsubstituted or halogen-substituted polyolefin which, on being subjected to shearing stresses, forms a fibrous network of small fibers, often microscopically sized fibers, which entrap the solid active catalyst particles. Examples of the suitable fibrillatable polyolefins are certain ethylene-propylene copolymers and certain polytetrafluoroethylenes (PTFE). Of the latter, which is preferred, there are two types. One is a colloidial aqueous dispersion concentrated to about 60% by weight of polymer, having particles from about 0.05 to about 0.5 microns in size, with average diameters of about 0.2 microns. This aqueous dispersion, of course, could be used in the instance where the solid catalytic particles are insensitive to the presence of water. Of course, where there is a water sensitivity, such colloidial aqueous dispersion could not be used. In such a case, the PTFE, preferred in the practice of this invention, consists of solid agglomerates with average diameters of 450 microns, made up of primary particles ranging in size from 0.05 to 0.5 microns in diameter. Specific surface areas of PTFE powders are of the order of 1 to about 12 $m^2/g$ with an average apparent powder density of 475 g/liter. The foregoing types of PTFE are more fully described in U.S. Pat. No. 2,559,752. While other fibrillatable polyolefins are useful in the practice of this invention, the PTFE, sold as "Teflon K" by The Dupont Company, is preferred.

Where the PTFE is the fibrillatable polyolefin of choice, the light powder known as Teflon K, Type 10, is worked at a temperature of from about 20° C. to about 120° C., and preferably, of course, at ambient conditions. The common working temperature in order to produce a fibrous mat, is about 100° C. or below.

Once mixed, the catalyst particles, the non-fibrillatable polyolefin and the fibrillatable polyolefin are subjected to mechanical shearing forces such that the latter polyolefin becomes fibrillated and the catalyst particles are entrapped in a fibrous network.

The non-fibrillatable polyolefin appears to collect this network of catalyst on its surface such that what would have been previously excessive shearing forces no longer serve to randomize the size of the catalyst particles trapped in the network. While the fibrous network is known, it was also known that there was danger in subjecting it to excessive shearing forces which are known to cause a randomization of particle size and hence a widening of the particle size range. The presence of the non-fibrillatable polyolefin removes this danger and surprisingly produces particles having a narrow PSD and a large particle size. The presence of the non-fibrillatable polyolefin having a narrow PSD appears to stabilize the catalyst particle size.

The shearing (mixing) action is done mechanically under an inert atmosphere, preferably nitrogen, in any one of a number of well-known commercially available pieces of equipment such as a ball mill, pugg mill, blender, or the like. This mechanical shearing is performed for a time sufficient to form a fibrous mat and to cause the mat to adhere to the non-fibrillatable polyolefin, usually from about one to about sixty minutes, with the preferable period from five to about forty minutes. Of course, longer times can be used, but serve no useful purpose once the shapable fibrous mat is formed and becomes protected by the non-fibrillatable olefin.

The shearing time, of course, is easliy determined within the above parameter and is dependent upon temperature and the concentration of the components in the mix. When at higher temperatures, the mixing time is reduced, as is the mixing time when a higher concentration of the fibrillatable polyolefin is used.

Thus, it can be seen that, following the catalyst preparation discussed above, polyolefins can be produced which have generally larger particles, at least about 98% of them being about 150 microns in diameter, and a more narrow PSD. The specific aspects of this invention and further advantages will be illustrated by the following examples which are offered for the purposes of illustration only and should not be considered to be limiting of the invention.

In the following examples the amounts are stated as parts by weight. When the tabular data is reviewed which relates to flow, homogeniety, fines, settling rate and particle size distribution, ratings are made on a scale of 1 to 5 where 5 is excellent and 1 is the lowest rating given. For instance, with respect to fines, a rating of 5 indicates that there are little or no fines present and would be an excellent rating. With respect to a settling rate in heptane a 5 rating is indicative of a fast settling rate while a 1 is a low rate. A 5 in particle size distribution is an indication that there is a narrow PSD. All of the observations and ratings are made by skilled personnel who are familiar with making such determinations such that they are objective rather than subjective in nature.

In determining visual spectra a 5 wt.% slurry of catalyst, or polymer, is mixed in normal heptane in a ⅞ inch outside diameter glass cylinder. The time required for 90% and 100% transmission of visual light (650 M$\mu$) through the agitated slurry is measured and recorded.

Unless otherwise indicated, the transition metal catalysts, PTFE, and the non-fibrillatable polyolefin are mixed in a vibramill (Spex mixer/mill, catalog number 8,000, Spex Industry, Inc., Scotch Plains, N.J.) containing three to four ⅝" diameter chromium/molybdinum steel balls. The materials are loaded in a "dry box" containing inert atmosphere and are subjected to the shearing forces for the time shown below.

Unless otherwise stated, the catalysts were evaluated for polymerization utilizing the following procedure. In an inert-atmosphere-dry box continually monitored for oxygen and water was assembled a 1000 ml. 4-neck flask equipped with a catalyst addition tube, mechanical stirrer, alpha-olefin inlet tube, reflex condenser (supplied from outside of the dry box with Isopar C (isooctane, sold by Exxon Company, U.S.A.) cooled to minus 80° C.) and a thermowell. To the flask was added 490 ml. purified heptane. The heptane was purged and saturated with alpha-olefin to be polymerized while the stirred solution was brought up to a temperature of 65° C. with two heat lamps and maintained at this temperature. Diethylaluminum chloride was added through a serum cap (4 ml. diethylaluminum chloride/10 cc heptane). The titanium trichloride catalyst was then added from the catalyst tube and the tube was rinsed with 10 cc of purified heptane. The alpha-olefin inlet and outlet to the flask were opened and the stirred reaction mixture was kept saturated with the alpha-olefin being polymerized for the duration of the run (2 hours from the time of TiCl$_3$ catalyst addition; 765±5 mm alpha-olefin and heptane pressure). At the completion of the run, heat was removed and the system was purged with dry nitrogen. The polymer was then precipitated by addition of 1000 ml. iso-propanol and stirred for 14 hours. The reaction mixture was filtered and the filtered polymer was stabilized with Ionox 330 (sold by Ciba-Geigy Corp.) (0.15%) followed by drying for three-six hours under vacuum at 65° C. For polypropylene polymerization runs, the filtrate was evaporated and percent waxy polymer recovered was recorded. The percent heptane insolubles (C$_7$-insolubles, %) of each of these runs was also measured by extracting with boiling heptane for five hours using a Soxhlet extractor. The percent heptane insolubles recorded include the soluble polymer in the reaction filtrate (waxy polymer).

Examples 1-4 and 30-32 are representative experimental results of controlled catalyst.

EXAMPLE 1

A TiCl$_3$.0.33 AlCl$_3$ catalyst obtained from Stauffer Chemical Company (TiCl$_3$.AA), representative of the type of material commercially available and frequently used in the polymerization industry, was tested to determine properties before applications of the method of this invention. Microscopic examination of the sample showed a wide particle size distribution and many catalyst fines. The material, when suspended in heptane, does not permit light transmittance even after it has been allowed to settle for more than 100 seconds. (See Table 1)

EXAMPLE 2

This example illustrates that the ballmilling, as described, is essential for making a good catalyst. A catalyst mixture was prepared as described above using 7.35 gms. of polypropylene, 7.35 gms. of TiCl$_3$AA catalyst, and 0.3 gms. PTFE (Teflon K, type 10, DuPont) manually mixed without significant agitation. It was not ballmilled. The catalyst has properties as indicated in Table 1 and is shown to have a wide particle size distribution including many catalyst fines.

EXAMPLE 3

This example illustrates the necessity for having fibrillatable PTFE present during the ballmilling. Ten gms. of polypropylene and five gms. of TiCl$_3$AA were ballmilled for 60 minutes. The properties show that the catalyst has a wide particle size distribution containing many catalyst fines. See Table 1.

EXAMPLE 4

This example illustrates the necessity for having polyolefin present during ballmilling to obtain a narrow particle size distribution product. 14.7 gms. of TiCl$_3$AA and 0.3 gms. of Teflon were mixed and ballmilled for 60 minutes. The product containing no fines, but had, however, a wide particle size distribution.

TABLE 1

| | CONTROL CATALYST SAMPLES | | | |
|---|---|---|---|---|
| EXAMPLE NO. | 1 | 2 | 3 | 4 |
| COMPOSITION | | | | |
| Polymer | — | PP | PP | |
| Wt % | — | 49 | 67 | 0 |
| TiCl$_3$AA,Wt % | 100 | 49 | 33 | 98 |
| PTFE,Wt % | — | 2 | 0 | 2 |
| BALLMILLED, MIN | 0 | 0 | 60 | 60 |
| APPEARANCE | | | | |
| Flow | 1 | 1 | 2 | 3 |
| Homogeneity | 1 | 1 | 1 | 2 |
| Fines | 1 | 1 | 1 | 5 |
| Color | purple dull | purple | purple dull | dk.purple shiny |
| BULK DENSITY IN FLASK | — | — | — | — |
| Settling rate in heptane | 1 | 1 | 1 | 5 |
| Visual Spectra | | | | |
| 90% sec. | >100 | >100 | >100 | <5 |
| 100% sec. | >100 | >100 | >100 | 10 |
| MICROSCOPE | | | | |
| P.S.D. | 1 | 1 | 1 | 3 |
| Color | purple | Wh.particles, purple cat. | purple | black |
| Fines (at 31x) | 1 | 1 | 1 | 5 |
| Shape | Irreg. | Spherical PP, Irreg. cat. | Irreg. | Irreg., V.large. |

EXAMPLES 5-7

These examples illustrate the effect of concentration of the non-fibrillatable polyolefin on catalyst properties. In these cases, as illustrated by the results in Table 2, the Wt.% of PTFE was being held constant while the Wt.% of polypropylene and TiCl$_3$AA catalyst was varied. As the concentration of polypropylene is decreased the particle distribution of the final catalysts is made more narrow.

TABLE 2

| | CONCENTRATION OF POLYPROPYLENE VS. CATALYST PROPERTIES | | |
|---|---|---|---|
| EXAMPLE NO. | 5 | 6 | 7 |
| COMPOSITION | | | |
| Polymer | PP | PP | PP |
| Wt %, Polymer | 66 | 49 | 20 |
| TiCl$_3$AA, Wt % | 32 | 49 | 78 |
| PTFE, Wt % | 2 | 2 | 2 |
| BALLMILLED, MIN | 60 | 60 | 60 |
| APPEARANCE | | | |
| Flow | 3 | 4 | 4 |
| Homogeneity | 5 | 5 | 3 |
| Fines | 5 | 5 | 5 |
| Color | purple, shiny | purple | purple |
| BULK DENSITY IN FLASK | — | — | — |
| Settling rate in heptane | 3 | 4 | 5 |
| Visual Spectra | | | |

TABLE 2-continued
CONCENTRATION OF POLYPROPYLENE VS. CATALYST PROPERTIES

| EXAMPLE NO. | 5 | 6 | 7 |
|---|---|---|---|
| 90%, sec. | <5 | 10 (dk. colored soln.) | <5 |
| 100%, sec. | 40 | 90 | 15 |
| MICROSCOPE | | | |
| P.S.D. | 3 | 3 | 4 |
| Color | purple | white & purple | purple |
| Fines (at 31x) | 3 | | 5 |
| Shape | Irreg.[1] | | Spherical[2] |

[1] Most of catalyst concentrated in specific agglomerates
[2] Regular or spherical and homogeneously covered with catalyst

EXAMPLE 8

A catalyst is prepared with amounts of polypropylene, $TiCl_3AA$, and PTFE (Teflon K, type 10) adjusted so that the concentration of the fibrillatable PTFE is 0.7 Wt.%. The properties of this catalyst can be compared with the properties of the catalysts prepared according to Example 6. See Table 3.

TABLE 3
CONCENTRATION OF PTFE VS. CATALYST PROPERTIES

| EXAMPLE NO. | 6 | 8 |
|---|---|---|
| Color | purple | purple |
| BULK DENSITY IN FLASK | — | — |
| Settling rate in heptane | 4 | 3 |
| Vis. Spectra | | |
| 90%, sec. | 10 (dk. colored soln.) | 40 |
| 100%, sec. | 90 | 100 |
| MICROSCOPE | | |
| P.S.D. | 3 | 2 |
| Color | Wh. & purple | purple |
| Fines (at 31x) | | 2 |
| Shape | | Irreg. |

EXAMPLES 9–13

A series of catalysts were prepared as in the preparation of Example 6 except that the non-fibrillatable polyolefin used was changed. The comparative properties of these examples, tabulated in Table 4, illustrate that the superior catalyst properties result regardless of polyolefin used.

TABLE 4
EFFECT OF NON-FIBRILLATABLE POLYOLEFIN COMPOSITION ON CATALYST PROPERTIES

| EXAMPLE NO. | 6 | 9 | 10 | 11 | 12 | 13 |
|---|---|---|---|---|---|---|
| COMPOSITION | | | | | | |
| Polymer | PP | PE/PP[1] | PE/PP[2] | PE/PP[3] | PE | PVC |
| Wt % | 49 | 49 | 49 | 49 | 49 | 49 |
| $TiCl_3AA$, Wt % | 49 | 49 | 49 | 49 | 49 | 49 |
| PTFE, Wt % | 2 | 2 | 2 | 2 | 2 | 2 |
| BALLMILLED, MIN | 60 | 60 | 60 | 60 | 60 | 60 |
| APPEARANCE | | | | | | |
| Flow | 4 | 4 | 4 | 4 | 4 | 5 |
| Homogeneity | 5 | 5 | 5 | 5 | 5 | 5 |
| Fines | 5 | 5 | 5 | 5 | 5 | 5 |
| Color | purple | purple | purple | purple | darker purple, shiny | dk.purple |
| BULK DENSITY IN FLASK | — | 75% | 75% | 75% | 50% | — |
| Settling rate in heptane | 4 | 5 | 5 | 5 | 4 | 5 |
| Vis. Spectra | | | | | | |
| 90%, sec. | 10 (dk.colored soln) | <5 | <5 | <5 | <5 | 5 |
| 100%, sec. | 90 | 10 | 10 | 10 | 40 | 10 |
| MICROSCOPE | | | | | | |
| P.S.D. | 3 | 4 | 4 | 4–5 | 3 | 3 |
| Color | Wh.&purple | purple | purple | purple | purple | black |
| Fines (at 31x) | | 4–5 | 5 | 5 | 4 | 3 |
| Shape | | Sph. & Irreg. | Irreg. | Sph.& Irreg. Much better cat. coverage. PC = not fractured. | Irreg. | Irreg. Smaller than other samples. Yellow color in $C_7$ soln. from cat. Cat. impacted on polymer. |

[1] 5.3 Wt % PE;
[2] 14.9 Wt % PE;
[3] 17.0 Wt % PE

CONCENTRATION OF PTFE VS. CATALYST PROPERTIES

| EXAMPLE NO. | 6 | 8 |
|---|---|---|
| COMPOSITION | | |
| Polymer | PP | PP |
| Wt % | 49 | 49.7 |
| $TiCl_3AA$, Wt % | 49 | 49.7 |
| PTFE, Wt % | 2 | 0.7 |
| BALLMILLED, MIN | 60 | 60 |
| APPEARANCE | | |
| Flow | 4 | 4 |
| Homogeneity | 5 | 4 |
| Fines | 5 | 5 |

EXAMPLES 14–20

Samples of the non-fibrillatable polyolefin used in examples of this invention are identified in Examples 14–20. Properties of these polyolefins are tabulated in Table 5.

EXAMPLES 21–29

The necessity of including the PTFE with the non-fibrillatable polyolefin and catalyst is illustrated by Examples 21–29, the data from which is shown in Table 6.

Ballmilling of TiCl₃AA catalyst with polypropylene, polyethylene, or polyvinylchloride without the presence of PTFE leads to catalysts with wide particle size distribution having many catalyst fines. Catalysts ballmilled with PTFE, non-fibrillatable polyolefin and catalyst particles lead to materials having a narrow particle distribution as shown in other Examples.

EXAMPLES 30-37

Catalysts prepared according to previous Examples were tested by polymerizing the indicated olefin in accordance with the procedure previously described.

The properties of the finished polymer are as shown in Table 7.

EXAMPLE 38

This example illustrates one advantage of this invention by demonstrating the problem when the catalyst and fibrillatable PTFE are excessively ballmilled absent the non-fibrillatable polymer. In accordance with procedures previously described, 9.95 gms of $TiCl_3.0.33$ $AlCl_3$ having particle size diameters varying from 0.1 to 100 microns was mixed, and ballmilled for 15 minutes with 0.05 gms of a fibrillatable PTFE resulting in a catalytic material having large particle size diameters from 20 to 2000 microns.

TABLE 5

| IDENTIFICATION OF NON-FIBRILLATABLE POLYOLEFINS USED IN STUDY | | | | | | | |
|---|---|---|---|---|---|---|---|
| EXAMPLE NO. | 14 | 15 | 16 | 17 | 18 | 19 | 20 |
| Composition | PP | PP | PVC | PE/PP | PE/PP | PE/PP | PE |
| Wt % PE | — | — | — | 5.3 | 14.9 | 17.0 | 100 |
| Ballmilled, min | 60 | 0 | 0 | 0 | 0 | 0 | 0 |
| Shape | Irreg. | Spherical | Spherical | Spherical | Spherical | Spherical | Spherical |
| Settling rate in heptane | 2 | 5 | 5 | 5 | 5 | 5 | 4 |
| Vis. Spectra Time for 100% transmission, sec. | 70 | 10 | <10 | <10 | 30 | 15 | 20 |
| Microscope P.S.D. | 1 | 5 | 5 | 5 | 4 | 4 | 3 |
| Shape | Irreg. | Spherical | Spherical | Spherical | Mainly Spherical | Shiny Spherical | Irreg. |

TABLE 6

| OLEFIN POLYMERIZATION CATALYST BALLMILLED WITH POLYOLEFIN IN ABSENCE OF PTFE | | | | | | | | | |
|---|---|---|---|---|---|---|---|---|---|
| EXAMPLE NO. | 21 | 22 | 23 | 24 | 25 | 26 | 27 | 28 | 29 |
| COMPOSITION | | | | | | | | | |
| Polymer, of Example No. | 15 | 20 | 16 | 15 | 17 | 18 | 19 | 20 | 16 |
| Wt % Polymer | 2 | 2 | 2 | 50 | 50 | 50 | 50 | 50 | 50 |
| TiCl₃AA, Wt % | 98 | 98 | 98 | 50 | 50 | 50 | 50 | 50 | 50 |
| PTFE, Wt % | 0 | 0 | 0 | 0 | 0 | 0 | 0 | 0 | 0 |
| BALLMILLED, MIN | 60 | 60 | 60 | 60 | 60 | 60 | 60 | 60 | 60 |
| APPEARANCE | | | | | | | | | |
| Flow | 1 | 1 | 1 | 1 | 1 | 1 | 1 | 1 | 1 |
| Homogeneity | 1 | 1 | 1 | 1 | 1 | 1 | 1 | 1 | 1 |
| Fines | 1 | 1 | 1 | 1 | 1 | 1 | 1 | 1 | 1 |
| Color | purple | purple | purple | purple | purple | purple | purple | purple | purple |
| BULK DENSITY IN FLASK | | | | | | | | | |
| SETTLING RATE | | | | | | | | | |
| In C₇ | 1 | 1 | 1 | 1 | 1 | 1 | 1 | 1 | 1 |
| Visual spectra 90%, sec. | >100 | >100 | >100 | >100 | >100 | >100 | >100 | >100 | 100 |
| 100%, sec. | >100 | >100 | >100 | >100 | >100 | >100 | >100 | >100 | 100 |
| MICROSCOPE | | | | | | | | | |
| P.S.D. | 1 | 1 | 1 | 1 | 1 | 1 | 1 | 1 | 1 |
| Color | purple | purple | purple | purple | purple | purple | purple | purple | purple |
| Fines (at 31x) | 1 | 1 | 1 | 1 | 1 | 1 | 1 | 1 | 1 |
| Shape | Irreg. | Irreg. | Irreg. | Irreg. | Irreg. | Irreg. | Irreg. | Irreg. | Irreg. |
| Compare with catalyst of example | — | — | — | 6 | 9 | 10 | 11 | 12 | 13 |

TABLE 7

| OLEFIN POLYMERIZATION EXPERIMENTS | | | | | | | | |
|---|---|---|---|---|---|---|---|---|
| EXAMPLE NO. | 30 | 31 | 32 | 33 | 34 | 35 | 36 | 37 |
| CATALYST COMPOSITION OF EXAMPLE NO. | 1 | 3 | 4 | 21 | 10 | 10 | 6 | 10 |
| Properties of Polymerized olefin | | | | | | | | |
| Monomer Polymerized | $C_3=$ | $C_3=$ | $C_3=$ | $C_3=$ | $C_3=$ | $C_2=$ | $C_3=$ | $C_3=$ |
| Catalyst Efficiency[a] | 33.9 | 36.6 | 25.6 | 40.0 | 34.4 | 105.7 | 32.1 | 150.6[b] |
| Waxy Polymer, % | 3.9 | 3.3 | 3.9 | 3.4 | 1.7 | 0.8 | 3.2 | 4.7 |
| C₇-Insolubles, % | 93.9 | 93.6 | 93.5 | 94.5 | 95.3 |  | 94.9 | 82.5 |
| Wet Bulk Density, | | | | | | | | |

TABLE 7-continued

OLEFIN POLYMERIZATION EXPERIMENTS

| EXAMPLE NO. | 30 | 31 | 32 | 33 | 34 | 35 | 36 | 37 |
|---|---|---|---|---|---|---|---|---|
| CATALYST COMPOSITION OF EXAMPLE NO. | 1 | 3 | 4 | 21 | 10 | 10 | 6 | 10 |
| gms/cc | | 0.21 | 0.139. | 0.20 | 0.154 | 0.192 | 0.165 | |
| Dry Bulk Density, gms/cc | 0.38 | 0.25 | 0.33 | 0.42 | 0.20 | 0.22 | 0.22 | 0.14 |
| Particle Size Distribution | | | | | | | | Narrow |
| Wt % on 20 mesh | 0.4 | 0.5 | 21.9 | 2.7 | 13.7 | 51.0 | 10 | |
| 30 mesh | 0.4 | 3.6 | 27.2 | 8.8 | 33.6 | 31.5 | 22.9 | |
| 60 mesh | 18.7 | 30.2 | 39.4 | 33.0 | 47.9 | 15.6 | 52.0 | |
| 100 mesh | 22.7 | 15.1 | 8.0 | 16.7 | 4.3 | 1.4 | 10.0 | |
| 140 mesh | 16.5 | 38.1 | 1.8 | 12.8 | 0.5 | 0.5 | 2.9 | |
| 200 mesh | 13.9 | 2.1 | 1.3 | 8.4 | 0 | | 1.8 | |
| 325 mesh | 13.9 | 9.9 | 0.4 | 14.1 | 0 | | 0.4 | |
| 325+ | 13.5 | 0.5 | 0 | 3.5 | 0 | | | |

(a) Gms $PC_n$ = x (gm catalyst)$^{-1}$ × (2 hrs)$^{-1}$
(b) $Et_3Al$ cocatalyst Ballmilling for an additional four hours produced small catalyst particles having diameters from 0.1 to 50 microns.

What is claimed is:

1. A Ziegler type titanium halide catlayst composition for the polymerization of alpha-olefins having a narrow particle size distribution which comprises:
   (a) from about 30 to about 80 Wt.% of catalytically active titanium halide catalyst particles;
   (b) from about 1 to about 5 wt.% of a fibrillated polytetrafluoroethylene entrapping the catalyst particles; and
   (c) from about 70 to about 20 Wt.% of a non-fibrillatable unsubstituted or halogen-substituted polyolefin stabilizing the catalyst against particle size degradation from ballmilling.

2. The catalyst composition of claim 1 wherein the titanium halide catalyst particles are from about 40 Wt.% to about 60 Wt.%; the fibrillated polytetrafluoroethylene is from about 1.0 Wt.% to about 2.5 Wt.% and the non-fibrillatable polyolefin is from about 40 to about 60 Wt.%.

3. The catalyst of claim 1 wherein the non-fibrillatable polyolefin is selected from polypropylene, polyethylene, an ethylene/propylene copolymer, polyvinylchloride or mixture thereof.

4. The catalyst of claim 1 wherein the titanium halide catalyst particles are of the formula:
   (a) $TiCl_3 \cdot xAlCl_3$ where x is from 0.01 to about 1.5; or
   (b) $TiCl_m \cdot xAlR_nCl_{(3-n)}$ where x is from 0.01 to about 1.5, m is from 2 to 3.5, n is from 0.01 to 3 and R is an organic hydrocarbon radical.

5. The catalyst of claim 4 wherein the non-fibrillatable polyolefin is selected from polypropylene, polyethylene, an ethylene/propylene copolymer polyvinylchloride or mixture thereof.

6. The catalyst of claim 5 wherein the composition contains from about 40 Wt.% to about 60 Wt.% of the titanium halide catalyst particles; from about 1.5 Wt.% to about 2.5 Wt.% of the fibrillated polytetrafluoroethylene; and from about 40 to about 60 Wt.% of the non-fibrillatable polyolefin.

7. A method for preparing a Ziegler-type titanium halide catalyst component having a narrow particle size distribution which comprises the steps of mixing fibrillatable polytetrafluoroethylene, non-fibrillatable unsubstituted or halogen-substituted polyolefin particles, and catalytically active titanium halide catalyst particles such that the resulting mixture contains from about 1 Wt.% to about 5 Wt.% of the polytetrafluoroethylene, from about 20 Wt.% to about 70 Wt.% of the non-fibrillatable unsubstituted or halogen-substituted polyolefin particles, and, correspondingly, from about 80 Wt.% to about 30 Wt.% of the titanium halide catalyst particles; subjecting the mixture to mechanical shearing forces for a time sufficient to cause a fibrous mat to form, entrapping the titanium halide catalyst particles therein, with attachment to the non-fibrillatable polyolefin particles such that catalyst component particles having a narrow particle size distribution result.

8. The method of claim 7 wherein the titanium halide catalyst has the formula $TiCl_3 \cdot xAlCl_3$, where x has an average value of from 0.01 to 1.5, or $TiCl_m \cdot xAlR_nCl_{3-n}$, where x has an average value of from 0.01 to 1.5, m has an average value of from 2 to 3.5, n has an average value of from 0.01 to 3, and R is an organic hydrocarbon radical.

9. The method of claim 8 wherein the non-fibrillatable polyolefin is selected from polypropylene, polyethylene, ethylene/propylene copolymers, polyvinyl chloride or mixtures thereof.

10. The method of claim 9 wherein the non-fibrillatable polyolefin has a narrow particle size distribution and a diameter of at least 20 microns.

* * * * *